March 5, 1957 J. WIELECHOWSKI 2,783,805
FOOD SLICING MACHINES
Filed April 28, 1955
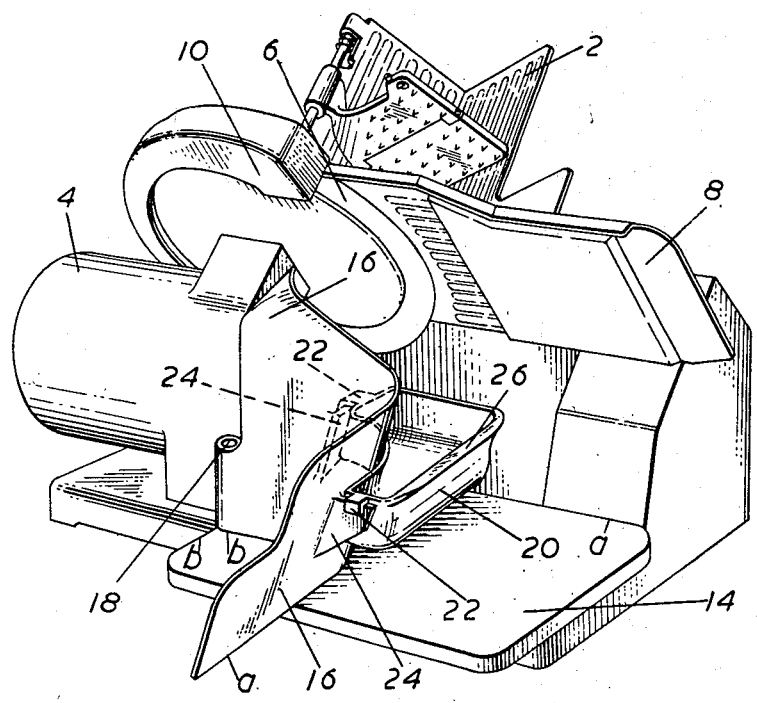
Inventor
Jozef Wielechowski
By
Attorneys

United States Patent Office 2,783,805
Patented Mar. 5, 1957

2,783,805
FOOD SLICING MACHINES

Jozef Wielechowski, Slough, England, assignor to Lan-Elec Limited, Slough, England Application April 28, 1955, Serial No. 504,428

3 Claims. (Cl. 146—102)

This invention relates to a food slicing machine and more specifically to a machine in which cut slices of food falling from the cutting blade are guided onto a receiving table by means of a hinged deflector plate.

A food slicing machine with which this invention is concerned comprises a cutting blade, means for bringing a food piece into cutting relationship with the said blade, a table for receiving cut slices of food falling from the said blade and a hinged deflector plate by which the said slices may be guided onto the said receiving table.

In such machines it is usual to provide a scrap container for retaining thin slices of rind and other scraps falling from the front face and cutting edge of the blade. Such containers must be mounted immediately below the cutting edge of the blade, in which position their removal may well be a matter of some danger and inconvenience.

It is a principal object of the invention to overcome this difficulty in a food slicing machine in which cut slices of food falling from the cutting blade are guided onto a receiving table by means of a hinged deflector plate, by mounting the scrap container on the deflector plate, so that when the deflector plate is in its working position the scrap container is held below the cutting blade to receive any scraps falling from it, and is removed from the locality of the blade when the deflector is swung away from its working position.

So that the invention may be thoroughly understood, a typical arrangement in accordance with it will be described in some detail by way of example with reference to the accompanying drawing which shows a gravity feed food slicing machine having a sloping chute 2 of V cross section by which food to be cut is carried. A motor 4 is arranged to impart reciprocal movement to the chute 2. A cutting blade 6 is arranged to be rotated by the motor 4. A table 8 limits the downward movement of a food piece in the chute 2. The blade 2 projects beyond the table 8 by an adjustable distance. The table 8 and the chute 2 serve to bring the food piece into cutting relationship with the blade 6. A sharpener 10 is provided to sharpen the blade 6.

In operation sliced food falling from the blade 2 is deflected onto a horizontal square receiving table by a hinged L-shaped deflector plate 16. The plate 16 is hinged to the body of the machine by a vertical hinge 18, it is shown in the open position. When in operative position the sides a and b of the plate lie along the corresponding sides of the receiving table 14. One of the upper edges of the plate 16 lies closely alongside the rear face of the cutting blade 6.

An L-shaped scrap container 20 in accordance with the invention is removably mounted on the outside angle of the deflector plate 16 in such a position that when the plate is in operative position the container is held underneath the cutting edge of the blade 6 so as to receive and retain any scraps falling therefrom. The container 20 is mounted by means of two integrally formed hooks 22, one at each end which fit over two co-operating lugs 24 one on each side of the angle of the deflector plate 16 and integral therewith.

The container 20 has a flanged outer edge 26 to aid in the collection of scraps and is of such a size that it substantially fills the whole space bounded by the deflector plate and the casing of the machine below the cutting blade. All the corners of the container are curved to facilitate cleaning. The container is a polished chromium plated casting.

In this arrangement it will readily be seen that the opening of the deflector plate automatically removes the scrap container and any scraps from the vicinity of the cutting blade.

I claim:

1. In a machine for slicing food, a cutting blade, means for bringing a food piece into cutting relationship with the said blade, a table for receiving cut slices of food falling from the said blade, a hinged deflector plate by which the said slices may be guided onto the said receiving table and a tray removably mounted on the said deflector plate normally inaccessibly disposed between the blade and deflector plate and adapted, when the said plate is in operative position, to retain scraps of food such as thin slices of rind, falling from the said blade.

2. In a machine for slicing food, a cutting blade, means for bringing a food piece into cutting relationship with the said blade, a table for receiving cut slices of food falling from the said blade, a hinged deflector plate by which the said slices may be guided onto the said receiving table, a pair of lugs integral with the said deflector plate, and a tray normally inaccessibly disposed between the blade and deflector plate having a pair of integrally formed hooks arranged for co-operation with the said lugs whereby the said tray may be removably mounted on the said deflector plate adapted, when the said plate is in operative position, to retain scraps of food such as thin slices of rind, falling from the said blade.

3. In a machine for slicing food, a cutting blade, a means for bringing a food piece into cutting relationship with the said blade, a horizontal, substantially square table for receiving cut slices of food falling from the said blade, an L-shaped deflector plate hinged to the body of the machine by a vertical hinge at one end, so that in operative position the lower edges of the said plate lie along two adjacent sides of the said receiving table and one of the upper edges lies closely alongside a face of the said cutting blade, said deflector plate serving to guide the said cut slices of food onto the said table and a tray removably mounted by means of co-operating integrally formed hooks and lugs, on the outside of the angle of the said deflector plate, so as to be held below the edge of the said blade when the said deflector plate is in operative position.

References Cited in the file of this patent

UNITED STATES PATENTS

| 1,677,437 | Folk | July 17, 1928 |
| 2,151,862 | Meeker et al. | Mar. 28, 1939 |